US007959202B2

(12) United States Patent
Ahn

(10) Patent No.: US 7,959,202 B2
(45) Date of Patent: Jun. 14, 2011

(54) VEHICLE TRAY HAVING AN OPEN-PREVENTION MECHANISM

(75) Inventor: Gye Young Ahn, Seoul (KR)

(73) Assignee: Kia Motors Corporation, Seoul (KR)

(*) Notice: Subject to any disclaimer, the term of this patent is extended or adjusted under 35 U.S.C. 154(b) by 184 days.

(21) Appl. No.: 12/347,595

(22) Filed: Dec. 31, 2008

(65) Prior Publication Data

US 2009/0277906 A1 Nov. 12, 2009

(30) Foreign Application Priority Data

May 7, 2008 (KR) ........................ 10-2008-0042364

(51) Int. Cl.
*B60N 3/12* (2006.01)

(52) U.S. Cl. ............... 296/37.8; 296/187.05; 296/37.12; 296/1.04

(58) Field of Classification Search ............... 296/24.34, 296/187.05, 37.8, 37.9, 37.12, 1.04; 312/327; 292/198, 92, 93, DIG. 65
See application file for complete search history.

(56) References Cited

U.S. PATENT DOCUMENTS

| | | | | |
|---|---|---|---|---|
| 5,052,728 | A * | 10/1991 | Fukumoto | 296/37.12 |
| 5,386,636 | A * | 2/1995 | Asano | 296/37.12 |
| 5,388,901 | A * | 2/1995 | Asano | 296/37.12 |
| 6,213,533 | B1 * | 4/2001 | Widulle et al. | 296/37.12 |
| 6,471,262 | B1 * | 10/2002 | Schwab | 292/336.3 |
| 7,399,008 | B2 * | 7/2008 | Leopold | 292/92 |
| 2009/0218842 | A1 * | 9/2009 | Muller | 296/37.13 |
| 2009/2084023 | * | 11/2009 | Cho | 292/34 |

FOREIGN PATENT DOCUMENTS

WO WO-2007/031351 A1 * 3/2007

* cited by examiner

*Primary Examiner* — Jason S Morrow
(74) *Attorney, Agent, or Firm* — Morgan, Lewis & Bockius LLP

(57) ABSTRACT

A vehicle tray having an open-prevention mechanism may include a rotating member integrally connected to a tray cover and rotatably coupled to the tray to support the tray cover, and an inertia detecting member pivotally coupled to the tray, a portion of the inertia detecting member being selectively engaged with a stopper portion of the rotating member according to an impact to prevent rotation of the rotating member when the impact greater than a predetermined level is applied to the tray.

17 Claims, 4 Drawing Sheets

VEHICLE TRAY HAVING AN OPEN-PREVENTION MECHANISM

CROSS-REFERENCE TO RELATED APPLICATION

The present application claims priority to Korean Patent Application Number 10-2008-0042364 filed on May 7, 2008, the entire contents of which are incorporated herein for all purposes by this reference.

BACKGROUND OF THE INVENTION

1. Field of the Invention

The present invention relates to a vehicle tray having an open-prevention mechanism, and more particularly to a vehicle tray having an open-prevention mechanism in which a tray is not opened even when an impact greater than a certain level is applied thereto.

2. Description of Related Art

Generally, various trays for receiving small things, including an ash tray, are provided in a vehicle.

In such a tray, if an impact greater than a certain level is applied to a vehicle as in case of rapid acceleration or deceleration, substantial vertical vibration, or a vehicle crash, lock of a tray knob is released, and then the tray is opened by an elastic means or a gravity means which forces open the tray. However, since unintended opening of the tray upon an impact may cause a safety problem, the tray should pass compliance test for head impact protection in order to prevent unintended opening of the tray.

Technologies for preventing unintended opening of the tray, by rotation of a weight, are disclosed in Korean Patent Application Publication Nos. 2003-0055384 and 2006-0060067.

In Korean Patent Application Publication No. 2005-0120271, unintended opening of a tray is prevented by a structure in which a coupling groove is formed on a tray cover guide member and a hooking protrusion which is provided to a rotating body of a locking part is hooked to the coupling groove.

Further, in Korean Patent Application Publication No. 2007-0066775, another solution for preventing unintended opening of a tray is disclosed, in which a latch member for opening a tray is prevented from retreating by a rotating member which is provided with a stopper.

Though various solutions for preventing the tray from being unintentionally opened have been disclosed, more efficient mechanism for preventing unintended opening of a tray which meets head impact protection requirements is necessary to stay competitive in the relevant technology field.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a vehicle tray having an open-prevention mechanism which can prevent a tray from being unintentionally opened even when an impact greater than a certain level is applied to the vehicle.

In an aspect of the present invention, a vehicle tray having an open-prevention mechanism may include a rotating member integrally connected to a tray cover and rotatably coupled to the tray to support the tray cover, and an inertia detecting member pivotally coupled to the tray, a portion of the inertia detecting member being selectively engaged with a stopper portion of the rotating member according to an impact to prevent rotation of the rotating member when the impact greater than a predetermined level is applied to the tray.

A load limiting member may be provided to the inertia detecting member to allow the portion of the inertia detecting member to be engaged with the stopper portion of the rotating member of the tray cover when the impact greater than the predetermined level is applied to the tray.

The load limiting member may elastically bias the portion of the inertia detecting member away from the stopper portion of the rotating member in a normal state so as to permit the rotation of the rotating member of the tray cover.

The load limiting member may be a torsion spring.

The inertia detecting member may further include a weight member which responds to the impact greater than the predetermined level applied to the tray to engage the portion of the inertia detecting member with the stopper portion of the rotating member.

The rotating member may further include a guide portion to guide the rotation of the rotating member in a normal state, the guide portion being in communication with the stopper portion.

The guide portion may be formed along an outer circumference of the rotating member to receive the portion of the inertia detecting member in the normal state, wherein the guide portion is a slot having a predetermined radius with respect to a rotation center of the rotating member and wherein the portion of the inertia detecting member includes a locking pin configured to be received in the slot.

The inertia detecting member may further include a weight member not responding to impact less than the predetermined level applied to the tray so that the portion of the inertia detecting member is engaged with the guide portion of the rotating member.

The stopper portion may be extended from an end portion of the guide portion along a movement direction of the portion of the inertia detecting member, wherein the stopper portion is a slot formed along movement locus of the portion of the inertia detecting member and, wherein the portion of the inertia detecting member includes a locking pin configured to be received to the slot.

The stopper portion may be extended from an end portion of the guide portion along rotation direction of the inertia detecting member, one end of the inertia detecting member being pivotally coupled by a fixing member to the tray as a rotation center thereof, wherein curvature of the stopper portion and the curvature of locus of the portion of the inertia detecting member are substantially the same.

The inertia detecting member may further include a weight member which responds to the impact greater than the predetermined level applied to the tray such that the weight member rotates around the fixing member so as to move the portion of the inertia detecting member into the stopper portion of the rotating member, wherein the stopper portion is a slot formed along rotation locus of the portion of the inertia detecting member and, wherein the portion of the inertia detecting member is formed of a locking pin configured to be received to the slot.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
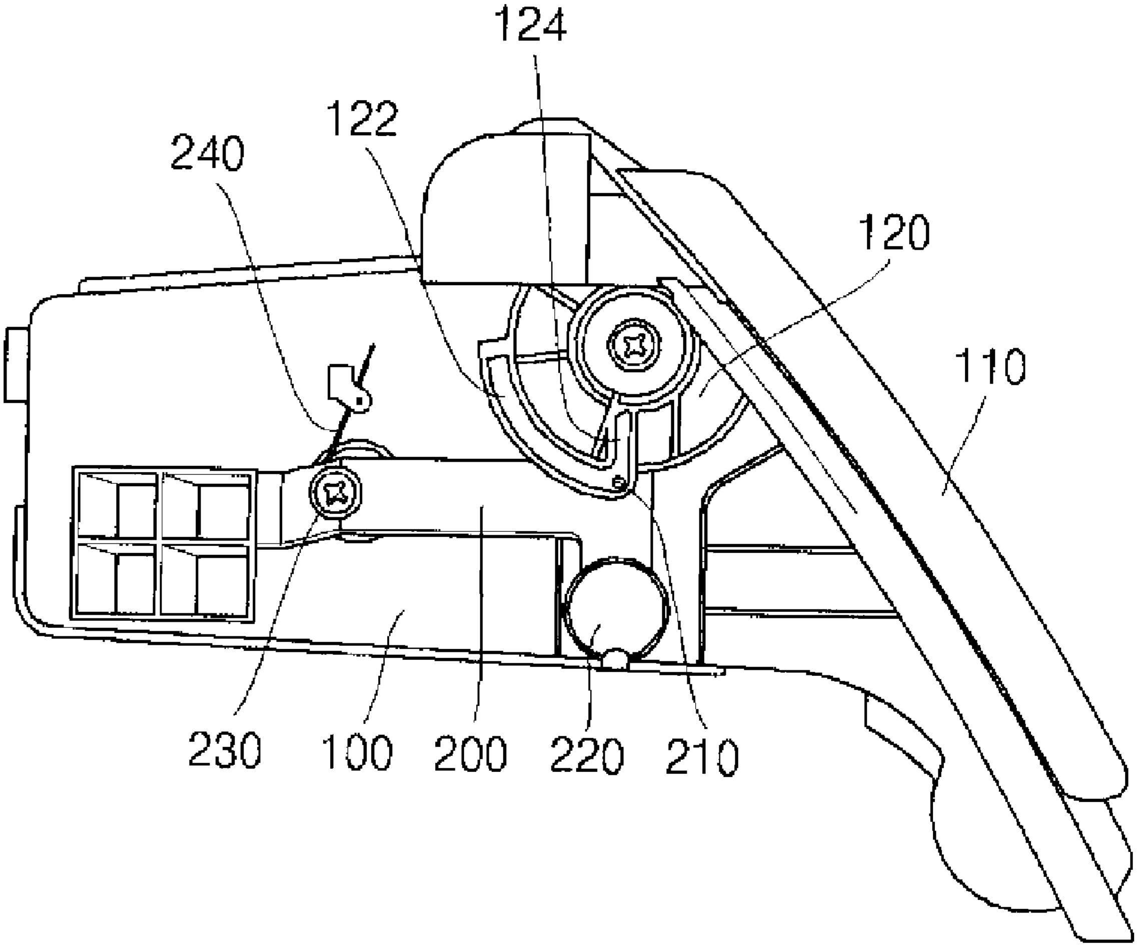
FIG. 1 is a side view of a vehicle tray having an open-prevention mechanism according to an exemplary embodiment of the present invention, when the tray is closed.
Figure 2:
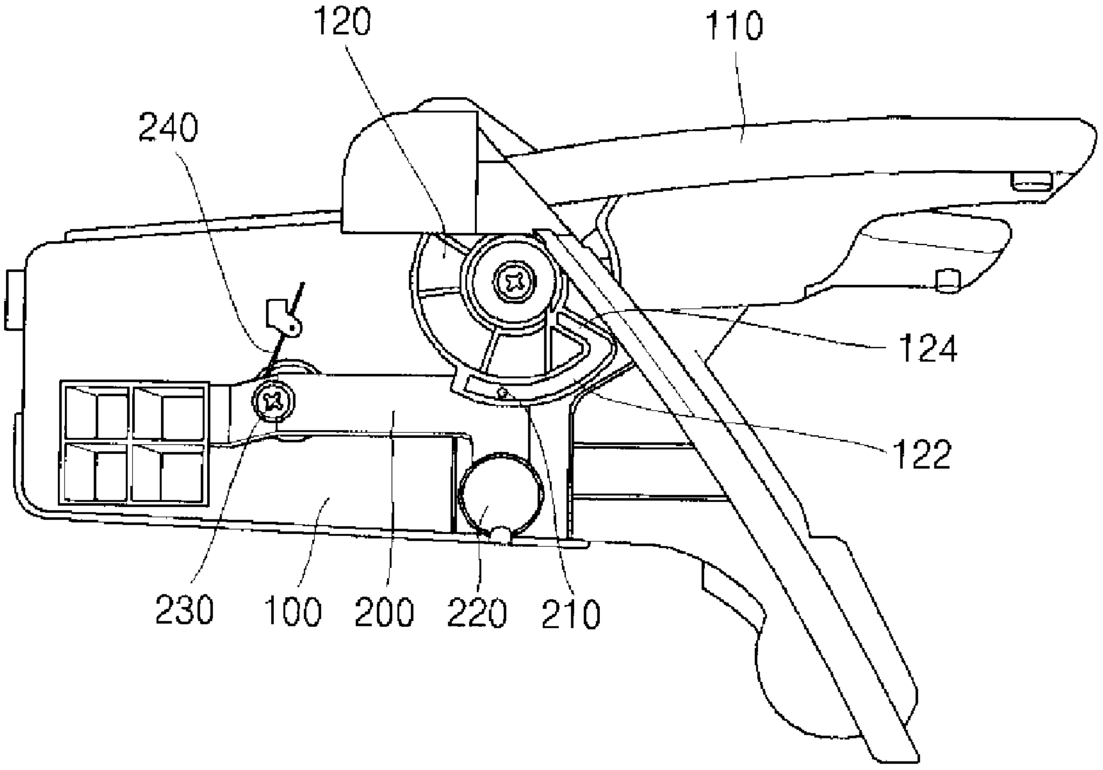
FIG. 2 is a side view of a vehicle tray having an open-prevention mechanism according to an exemplary embodiment of the present invention, when the tray is open.
Figure 3:
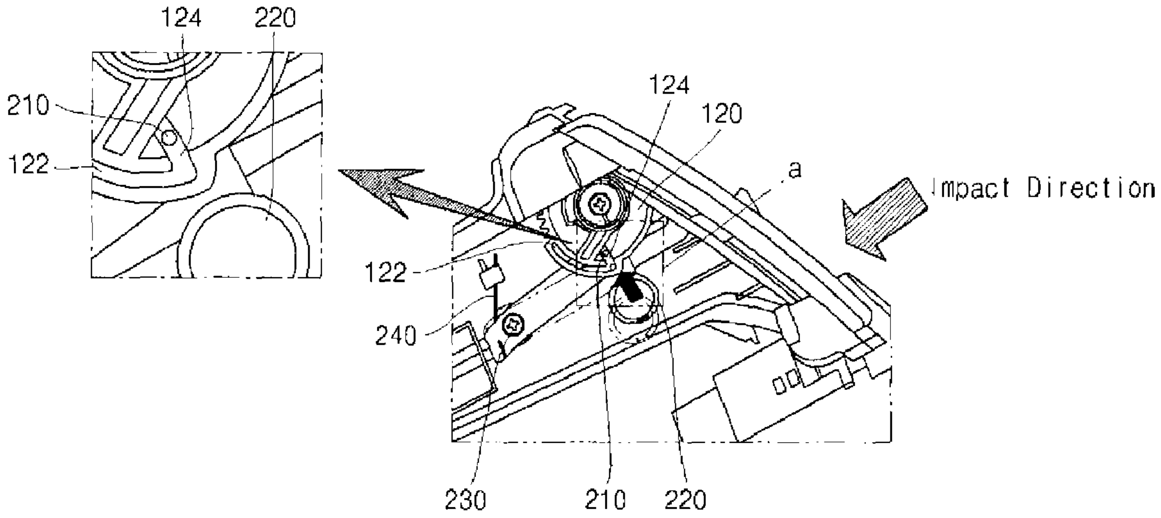
FIG. 3 is a schematic view showing an operation of an open-prevention mechanism of a vehicle tray according to an exemplary embodiment of the present invention when an impact is applied to the vehicle tray.
Figure 4:
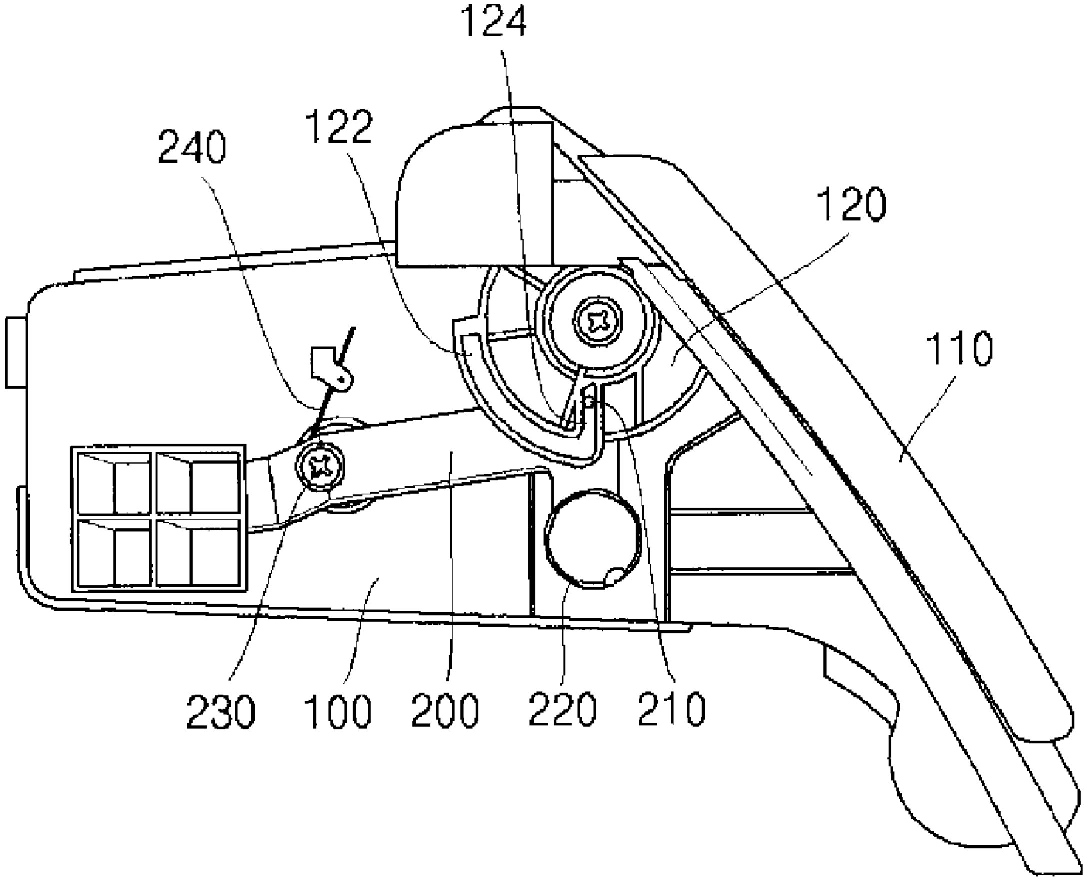
FIG. 4 is a side view of a vehicle tray having an open-prevention mechanism according to an exemplary embodiment of the present invention, when an inertia detecting member has been activated upon an impact.

FIG. 1 is a side view of a vehicle tray having an open-prevention mechanism according to various embodiments of the present invention, when the tray is closed, FIG. 2 is a side view of a vehicle tray having an open-prevention mechanism according to various embodiments of the present invention, when the tray is open, FIG. 3 is a schematic view showing an operation of an open-prevention mechanism of a vehicle tray according to various embodiments of the present invention when an impact is applied to the vehicle tray, and FIG. 4 is a side view of a vehicle tray having an open-prevention mechanism according to various embodiments of the present invention, when a inertia detecting member has been activated upon an impact.

As shown in FIG. 1 to FIG. 4, a tray 100 according to various embodiments of the present invention is opened and closed by a tray cover 110 which is rotatably coupled to the tray 100 by a rotating member 120. The rotating member 120 is connected to the tray 100, and an inertia detecting member 200 which prevents the tray cover 110 from being unintentionally opened is provided near the rotating member 120.

The rotating member 120 is rotatably connected to a side of the tray 100. A guide rail 122 in the form of a curved slot is formed in the rotating member 120 along a portion of an outer circumference of the rotating member 120, and a stopper slot 124 is extended from an end portion of the guide rail 122.

As shown in FIG. 1, when the tray cover 110 is not open, that is, when the tray 100 is closed, the guide rail 122 is located on a left-hand side of the rotating member 120 according to the exemplary embodiment depicted in FIG. 1.

As shown in FIG. 2, if the tray cover 110 is opened, the rotating member 120 is rotated so that the guide rail 122 is rotated into a position on a right-hand side of the rotating member 120 according to the exemplary embodiment depicted in FIG. 2.

In various embodiments of the present invention, the guide rail 122 may be a slot formed along a portion of an outer circumference of the rotating member 120 and is in a curved shape. From an end portion of the guide rail 122, the stopper rail 124 is extended, as shown in FIG. 1 and FIG. 2. At said end portion of the guide rail 122, the guide rail 122 and the stopper rail 124 are in communication with each other such that a locking pin 210 may move from the guide rail 122 to the stopper rail 124 and vice versa.

As shown in FIG. 3, the stopper rail 124, which is extended from said end portion of the guide rail 122, is extended in the same direction as a moving direction of the inertia detecting member 200, and in particular, in the same direction as a moving direction of the locking pin 210 formed in the inertia detecting member 200.

The locking pin 210 is received in the guide rail 122 at said end portion, when the tray is closed. However, when an impact greater than a certain level is applied to the vehicle and thereby to the tray, the locking pin 210 moves to the stopper slot 124 so as to prevent the tray cover 110 from being unintentionally opened.

As shown in FIG. 1 to FIG. 4, in various embodiments, the inertia detecting member 200 is formed to have a bent portion such that it is in a substantially "J" or "L" shape, and an end portion thereof is rotatably connected to a side of the tray 100 around a fixing member 230. A weight 220 is provided at another end portion of the inertia detecting member 200, and the locking pin 210 is provided between said end portion and said another end portion, preferably at said bent portion. In various embodiments, the locking pin 210 is formed by being protruded out of said bent portion of the "J" or "L" shaped inertia detecting member 200 so as to be received in the guide rail 122, and the fixing member 230 is a fixing screw 230. Near the fixing member 230, a load limiting member 240 which makes the inertia detecting member 200 operate only when an impact greater than a certain level is applied to the tray 100 so as to limit the magnitude of an impact which activates the inertia detecting member 200. In various embodiments, the load limiting member 240 is a torsion spring 240 which is provided to have the same axis as the fixing member 230, and accordingly, the inertia detecting member 200 reacts only to an impact greater than a level at which the repulsive force of the torsion spring 240 can be overcome and thus the inertia detecting member 200 can be rotated.

Operation of the inertia detecting member 200 will be explained hereinafter with reference to FIG. 1 to FIG. 4. If an impact is applied to the tray 100, the weight 220 moves upwardly by acceleration caused by the impact. Since the inertia detecting member 200 is configured to rotate around the fixing member 230, the weight 220 also moves along a circular arc around the fixing member 230. However, when the impact is less than a predetermined level, the repulsive force of the torsion spring 240 is not overcome, and upward movement of the weight 220 is restricted. Along with the upward movement of the weight 220 toward the rotating member 120, the locking pin 210 is also upwardly moved and is then entered into the stopper rail 124.

The operation of the locking pin 210 is described in further detail. In normal open/close operation of the tray 100, the location of the locking pin 210 has no effect on the rotation of the rotating member 120, since the locking pin 210 stays in the guide rail 122.

However, as shown in FIG. 3, if an impact (indicated by a big arrow) greater than a certain level is applied to a vehicle, the inertia detecting member 200 moves in a direction of an arrow "a" so that the locking pin 210 escapes from the guide rail 122 and moves into the stopper rail 124.

Since the locking pin 210, while staying in the stopper rail 124, restricts rotation of the rotating member 120, the tray cover 110 which is opened and closed by rotation of the rotating member 120 cannot be opened even though lock of a tray knob (not shown in the drawings) is released by the impact.

One thing that should be noted in this exemplary embodiment of the present invention is that the sensitivity of the inertia detecting member 200 should be set such that the magnitude of an impact at which the inertia detecting member 200 is activated so as to make the locking pin 210 move into the stopper rail 124 is smaller than the magnitude of an impact at which lock of the tray knob is released and the tray cover 110 is on the verge of being opened. This setting of the inertia detecting member 200 is of great importance in the present invention since, only when the inertia detecting member 200 is activated before locking of the tray knob is released upon an impact, can the inertia detecting member 200 prevent the tray cover 110 from being unintentionally opened.

Operation of the inertia detecting member 200 is explained in more detail. If the inertia detecting member 200 is activated by an impact and then lock of the tray knob is released, tray cover 110 starts to be opened and is continuously forced open by an elastic means or a gravity means (not shown in the drawing) which applies a force in a direction of opening the tray cover 110. Since the locking pin 210 of the inertia detecting member 200 has already moved into the stopper rail 124 following the activation of the inertia detecting member 200, the locking pin 210 is pressured onto or frictionally contacts a wall of the stopper rail 124 by the force applied to the tray cover 110 by the elastic means or the gravity means, so as to be prevented from moving downwardly toward the guide rail 122. As long as the locking pin 210 stays in the stopper rail 124, the rotating member 120 is prevented from rotating and accordingly the tray cover 110 is prevented from being further opened.

As described above, a vehicle tray having an open-prevention mechanism according to an exemplary embodiment of the present invention adopts the inertia detecting member, so even when lock of the tray knob is released by an impact greater than a specific level, the tray is not opened unintentionally, and thus regulations regarding head impact protection can be satisfied.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle tray having an open-prevention mechanism, comprising:

a rotating member integrally connected to a tray cover and rotatably coupled to the tray to support the tray cover, the rotating member including a guide portion formed thereon to guide the rotation of the rotating member in a normal state and a stopper portion, the guide portion being operably connected and open to the stopper portion; and an inertia detecting member pivotally coupled to the tray, the inertia detecting member including a load limiting member mounted thereto for allowing a portion of the inertia detecting member to be selectively engaged with the stopper portion of the rotating member of the tray cover when the impact is applied to the tray and a weight member mounted thereto to allow the weight member to respond selectively to the impact applied to the tray.

2. The vehicle tray of claim 1, wherein the load limiting member elastically biases the portion of the inertia detecting member away from the stopper portion of the rotating member in a normal state so as to permit the rotation of the rotating member of the tray cover.

3. The vehicle tray of claim 2, wherein the load limiting member is a torsion spring.

4. The vehicle tray of claim 1, wherein the weight member responds to the impact greater than a predetermined lever applied to the tray to engage the portion of the inertia detecting member with the stopper portion of the rotating member.

5. The vehicle tray of claim 1, wherein the guide portion is formed along an outer circumference of the rotating member to receive the portion of the inertia detecting member in the normal state.

6. The vehicle tray of claim 5, wherein the guide portion is a slot having a predetermined radius with respect to a rotation center of the rotating member.

7. The vehicle tray of claim 6, wherein the portion of the inertia detecting member includes a locking pin configured to be received in the slot.

8. The vehicle tray of claim 1, wherein the weight does not respond to impact less than a predetermined lever applied to the tray so that the portion of the inertia detecting member is engaged with the guide portion of the rotating member.

9. The vehicle tray of claim 1, wherein the stopper portion is extended from an end portion of the guide portion along a movement direction of the portion of the inertia detecting member.

10. The vehicle tray of claim 9, wherein the stopper portion is a slot formed along movement locus of the portion of the inertia detecting member.

11. The vehicle tray of claim 10, wherein the portion of the inertia detecting member includes a locking pin configured to be received to the slot.

12. The vehicle tray of claim 1, wherein the stopper portion is extended from an end portion of the guide portion along rotation direction of the inertia detecting member, one end of the inertia detecting member being pivotally coupled by a fixing member to the tray as a rotation center thereof.

13. The vehicle tray of claim 12, wherein curvature of the stopper portion and the curvature of locus of the portion of the inertia detecting member are substantially the same.

14. The vehicle tray of claim 12, wherein the weight member responds to the impact greater than a predetermined lever applied to the tray such that the weight member rotates around the fixing member so as to move the portion of the inertia detecting member into the stopper portion of the rotating member.

15. The vehicle tray of claim 14, wherein the stopper portion is a slot formed along rotation locus of the portion of the inertia detecting member.

16. The vehicle tray of claim 15, wherein the portion of the inertia detecting member is formed of a locking pin configured to be received to the slot.

17. A passenger vehicle comprising the vehicle tray of claim 1.

* * * * *